(12) United States Patent
McKenney et al.

(10) Patent No.: US 8,123,278 B1
(45) Date of Patent: Feb. 28, 2012

(54) RETRACTABLE DOOR MOUNTED APPLIQUÉ FOR OPPOSING-HINGED DOORS

(75) Inventors: Ronald P. McKenney, Rochester, MI (US); James S. Netherland, III, Clarkston, MI (US); Gregory B. Smith, Algonac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/913,910

(22) Filed: Oct. 28, 2010

(51) Int. Cl.
*B60J 10/08* (2006.01)
*B60J 5/04* (2006.01)

(52) U.S. Cl. ............ 296/146.9; 49/320; 49/321; 49/368

(58) Field of Classification Search ............... 296/146.9, 296/193.06, 202; 49/316, 320, 321, 366–368.471
See application file for complete search history.

(56) References Cited

U.S. PATENT DOCUMENTS

| 3,653,155 | A  | * | 4/1972  | DE Brunyn et al. | ............ 49/313 |
| 6,332,641 | B1 | * | 12/2001 | Okana | ........................ 296/146.6 |
| 2006/0043773 | A1 | * | 3/2006 | Azzouz et al. | ................ 296/202 |

* cited by examiner

*Primary Examiner* — Dennis Pedder
(74) *Attorney, Agent, or Firm* — Quinn Law Group, PLLC

(57) ABSTRACT

A vehicle includes a pair of opposing-hinged doors having a first door and a second door. The first and second doors each include a tumblehome portion that extends inboard of a first rotation axis and a second rotation axis respectively. The first door and second doors are disposed adjacent each other when in a closed position, and define a gap between the tumblehome portions of the first and second doors. An appliqué is moveably attached to one of the doors, and is moveable between a sealing position and a withdrawn position. When in the sealing position, the appliqué extends across the gap. When in the withdrawn position, the appliqué is spaced from one of the doors, thereby allowing the doors to simultaneously rotate open in opposite directions without the tumblehome portions of the doors contacting or otherwise interfering with each other.

9 Claims, 5 Drawing Sheets

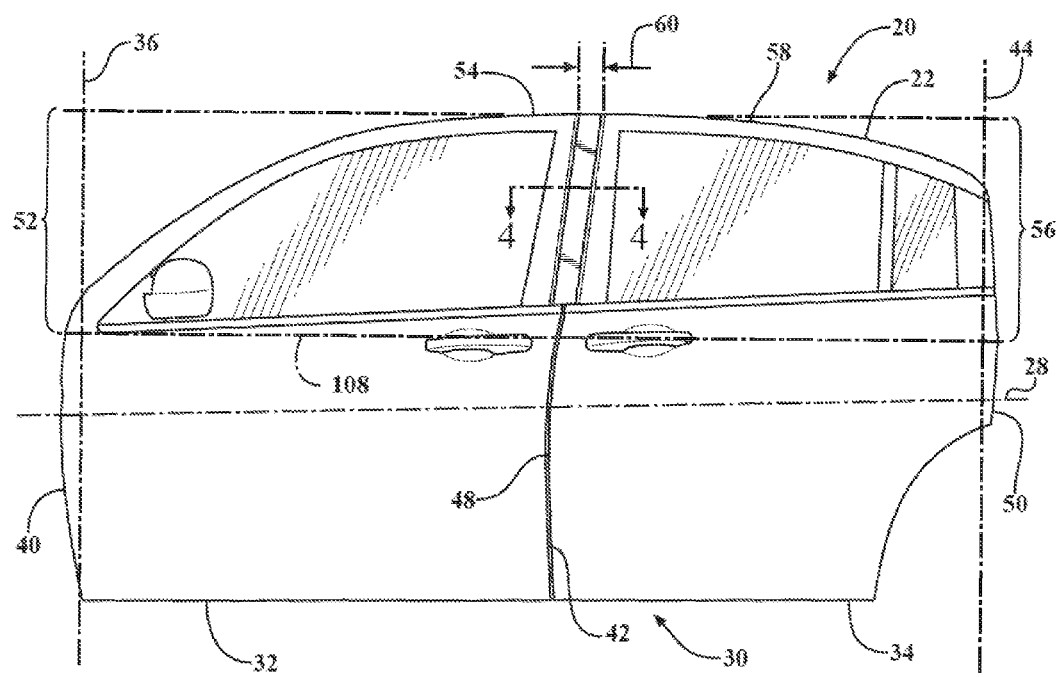
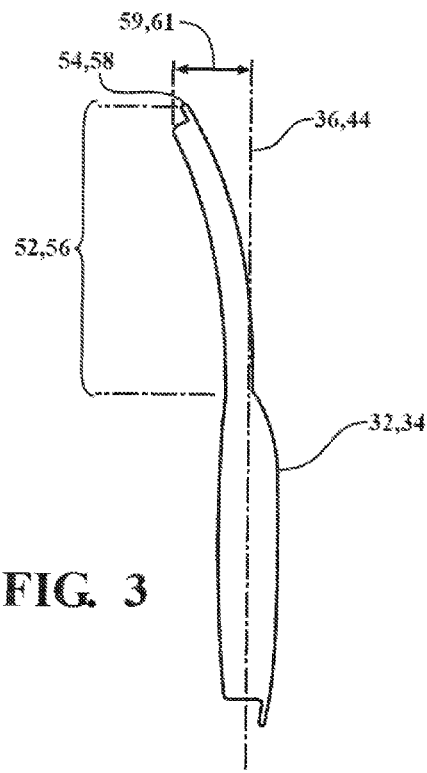
FIG. 2
FIG. 3

RETRACTABLE DOOR MOUNTED APPLIQUÉ FOR OPPOSING-HINGED DOORS

TECHNICAL FIELD

The invention generally relates to an appliqué for spanning a gap between a pair of opposing-hinged doors of a vehicle.

BACKGROUND

Opposing-hinged doors on vehicles include a first door, e.g., a forward door, and a second door, e.g., a rearward door, arranged on the same side of the vehicle, longitudinally adjacent to each other, with the second door disposed nearer a second end or back of the vehicle than the first door. Each of the opposing-hinged doors pivots open in an opposite direction. More specifically, the first door includes a forward edge disposed nearer the first end of the vehicle and a rearward edge disposed nearer a second end of the vehicle. The first door is hinged along a forward edge of the first door, and pivots open about a first rotation axis in a first rotation direction such that the rearward edge of the first door swings away from the vehicle when opening the first door and toward the vehicle when closing the first door. The second door also includes a forward edge disposed nearer the first end of the vehicle and a rearward edge disposed nearer the second end of the vehicle. The second door is hinged along the rearward edge of the second door, and pivots about a second rotation axis in a second rotation direction, which is opposite the first rotation direction, such that the forward edge of the second door swings away from the vehicle when opening the second door and toward the vehicle when closing the second door. Accordingly, the first door and the second door open and close in opposite directions.

Opposing-hinged doors may not include a body pillar disposed between the first door and the second door. When no body pillar exists between the first door and the second door, the first door and the second door are arranged immediately adjacent each other in sealing engagement. Typically, the opposing-hinged doors are arranged such that the more forward door, i.e., the first door, must be opened prior to and in order to open the more rearward door, i.e., the second door. In other words, opening the more rearward second door is dependent upon opening the more forward first door beforehand.

Some vehicle designs include the first door and the second door defining a tumblehome portion. The tumblehome portion is an upper portion of the door that slopes upward and inboard, i.e., upward and toward the center of the vehicle. When the tumblehome portion of the opposing-hinged doors is large enough, i.e., when an upper edge of the first and second doors extend laterally away from and inward toward the center of the vehicle from a rotation axis centerline of the first and second doors a sufficient distance, then the lateral edges along the tumblehome portions of the doors may contact each other and otherwise interfere with each other when the doors are opened simultaneously. This is because the rearward edge of the tumblehome portion of the first door moves closer toward the second door as the first door swings open about the first rotation axis, and the forward edge of the tumblehome portion of the second door moves closer toward the first door as the second door swings open about the second rotation axis.

SUMMARY

A vehicle is provided. The vehicle includes a body, and a pair of opposing-hinged doors. The pair of opposing-hinged doors includes a first door and a second door. The first door is rotatably attached to the body for rotation in a first rotation direction. The second door is disposed adjacent the first door, and is rotatably attached to the body for rotation in a second rotation direction. The second rotation direction is opposite the first direction. The first door and the second door each define a tumblehome portion. The first door and the second door are spaced from each other to define a gap between the first door and the second door. The gap is adjacent the tumblehome portions of the first door and the second door when the first door and the second door are in a closed position. An appliqué is coupled to at least one of the first door and the second door adjacent the tumblehome portions of the first door and the second door. The appliqué is moveable between a sealing position and a withdrawn position. The appliqué extends across the gap between the tumblehome portions when in the sealing position to cover the gap and seal against both the first door and the second door. The appliqué is spaced from at least one of the first door and the second door when in the withdrawn position to allow for the simultaneous rotation of the first door and the second door without interference between the tumblehome portions of the first door and the second door.

A vehicle is also provided. The vehicle includes a body, and a pair of opposing-hinged doors. The opposing-hinged doors include a first door and a second door. The first door is rotatably attached to the body for rotation between an open position and a closed position about a first rotation axis in a first rotation direction. The second door is disposed adjacent the first door, and is rotatably attached to the body for rotation between an open position and a closed position about a second rotation axis in a second rotation direction. The second rotation direction is opposite the first rotation direction. The first door includes a first tumblehome portion that extends inboard of the first rotation axis, and a first lateral edge. The second door includes a second tumblehome portion that extends inboard of the second rotation axis, and a second lateral edge. The second lateral edge is disposed adjacent the first lateral edge when the first door and the second door are disposed in their respective closed positions. The first lateral edge and the second lateral edge are spaced from each other to define a gap between the first tumblehome portion and the second tumblehome portion when in their respective closed positions. The gap allows simultaneous rotational movement of the first door about the first rotation axis and the second door about the second rotation axis without the first tumblehome portion and the second tumblehome portion interfering with each other. An appliqué is moveably coupled to the second door adjacent the second tumblehome portion. The appliqué is moveable between a sealing position and a withdrawn position. The appliqué extends across the gap when in the sealing position to cover the gap between the first tumblehome portion and the second tumblehome portion, and seal against both the first door and the second door. The appliqué is spaced from the first door when in the withdrawn position to allow for the simultaneous rotation of the first door about the first rotation axis in the first rotation direction and the second door about the second rotation axis in the second rotation direction.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is schematic fragmentary side plan view of the vehicle.

FIG. 3 is a schematic cross sectional side view of a pair of opposing-hinged doors of the vehicle.

DETAILED DESCRIPTION

Figure 1:
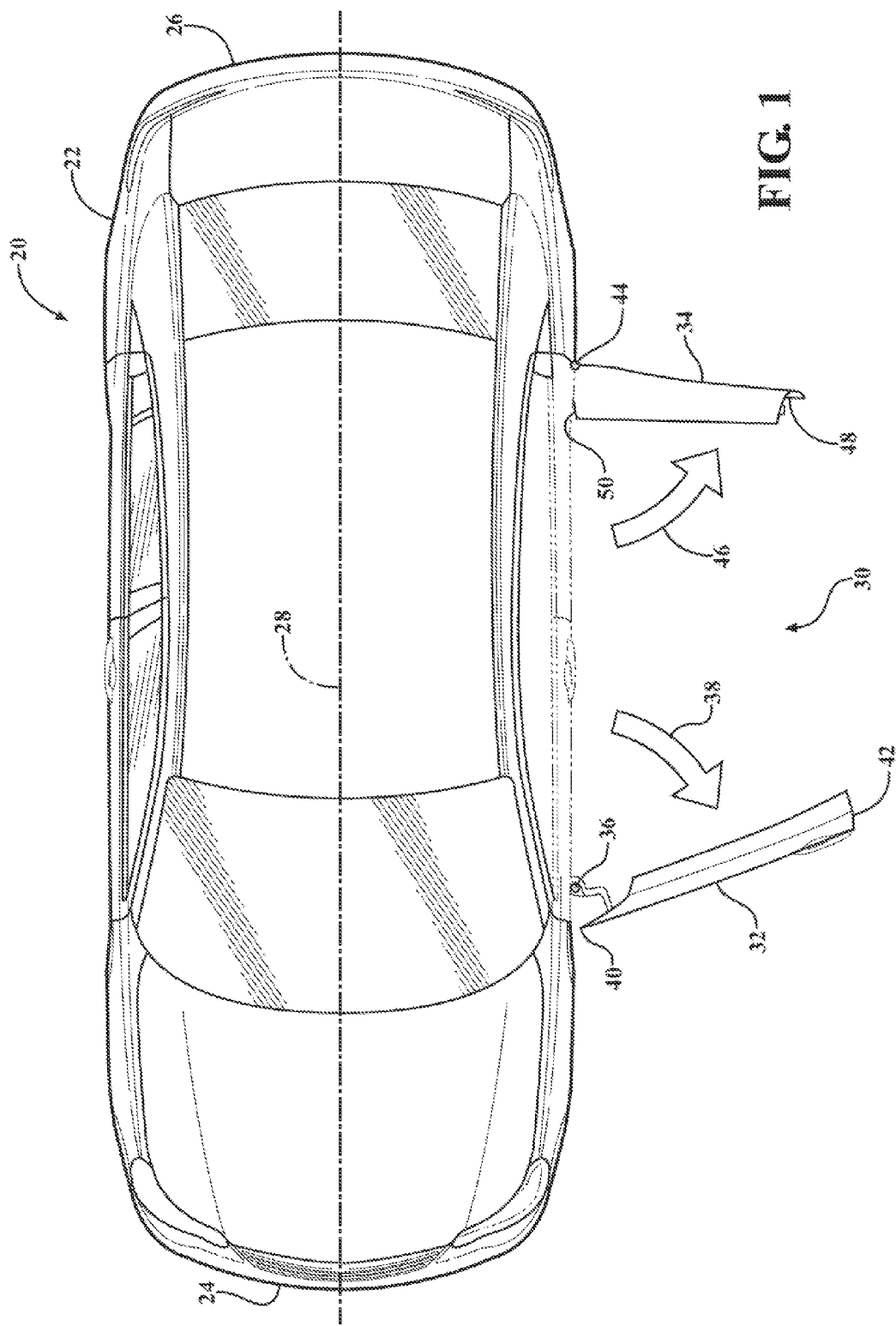
FIG. 1 is a schematic top plan view of a vehicle.

Referring to the Figures, wherein like numerals indicate like parts throughout the several views, a vehicle is shown generally at 20. Referring to FIGS. 1 and 2, the vehicle 20 includes a body 22. The body 22 may include a frame and any structural support elements attached thereto, as well as the outer sheet metal coverings attached to the frame and/or structural elements of the vehicle 20.

The body 22 includes a first end 24 and a second end 26. The second end 26 of the body 22 is disposed opposite the first end 24 along a longitudinal axis 28 of the body 22. As shown, the first end 24 of the vehicle 20 includes a front of the vehicle 20. However, the first end 24 of the vehicle 20 is not limited to the front of the vehicle 20. As shown, the second end 26 includes a back end of the vehicle 20. However, the second end 26 of the vehicle 20 is not limited to the back of the vehicle 20. The longitudinal axis 28 extends between the first end 24 and the second end 26 of the vehicle 20.

The vehicle 20 further includes a pair of opposing-hinged doors 30. The pair of opposing-hinged doors 30 includes a first door 32 and a second door 34. The first door 32 and the second door 34 are disposed on the same side of the vehicle 20, adjacent each other. As shown, the first door 32 is disposed nearer the first end 24 of the body 22 than the second door 34, and the second door 34 is disposed nearer the second end 26 of the body 22 than the first door 32. Accordingly, the first door 32 may be referred to as a forward side door, and the second door 34 may be referred to as a rear side door. However, it should be appreciated that the positions of the first door 32 and the second door 34 relative to the first end 24 and the second end 26 of the vehicle 20 may be other than that shown in the Figures.

The first door 32 is rotatably attached to the body 22 for rotation between an open position and a closed position. The first door 32 rotates about a first rotation axis 36 in a first rotation direction 38 when moving from the closed position to the open position. The first door 32 includes a first edge 40 and a second edge 42. The second edge 42 of the first door 32 is disposed opposite the first edge 40 along the longitudinal axis 28 of the body 22 when the first door 32 is in the closed position. Accordingly, the first edge 40 and the second edge 42 of the first door 32 define a forward edge and a rearward edge of the first door 32 respectively. As shown, the first edge 40 of the first door 32 is disposed nearer the first end 24 of the body 22 than the second edge 42 of the first door 32, and the second edge 42 of the first door 32 is disposed nearer the second end 26 of the body 22 than the first edge 40 of the first door 32. However, it should be appreciated that the positions of the first edge 40 and the second edge 42 of the first door 32 may be reversed from that shown in the Figures.

The second door 34 is rotatably attached to the body 22 for rotation between an open position and a closed position. The second door 34 rotates about a second rotation axis 44 in a second rotation direction 46 when moving from the closed position to the open position. The second rotation direction 46 is opposite the first rotation direction 38. The first rotation direction 38 may include one of a clockwise direction and a counterclockwise direction, and the second rotation direction 46 may include the other of the clockwise direction and the counterclockwise direction. As shown, the first rotation direction 38 includes the clockwise direction, and the second rotation direction 46 includes the counterclockwise direction. However, it should be appreciated that the first rotation direction 38 and the second rotation direction 46 may differ from that shown in the Figures.

The second door 34 includes a first edge 48 and a second edge 50. The first edge 48 of the second door 34 is disposed opposite the second edge 50 along the longitudinal axis 28 of the body 22 when the second door 34 is in the closed position. Accordingly, the first edge 48 and the second edge 50 of the second door 34 define a forward edge and a rearward edge of the second door 34. As shown, the first edge 48 of the second door 34 is disposed nearer the first end 24 of the body 22 than the second edge 50 of the second door 34, and the second edge 50 of the second door 34 is disposed nearer the second end 26 of the body 22 than the first edge 48 of the first door 32. However, it should be appreciated that the positions of the first edge 48 and the second edge 50 of the second door 34 may be reversed from that shown in the Figures.

Referring to FIGS. 2 and 3, the first door 32 includes a first tumblehome portion 52. The first tumblehome portion 52 is disposed along an upper portion of the second edge 42 of the first door 32. The first tumblehome portion 52 is the portion of the first door 32 that slopes inboard, i.e., inward, of the first rotation axis 36, i.e., the first tumblehome portion 52 slopes upward and inward toward a center of the vehicle 20 to an upper edge 54 of the first door 32, which is disposed inboard of the first rotation axis 36 a distance 59. The first tumblehome portion 52 is bounded on a lower end thereof by a spring line 108 of the opposing hinged doors 30. The spring line 108 is an imaginary line that extends generally horizontal along the pair of opposing hinged doors 30, above which the first tumblehome portion 52 bends inward. The first tumblehome portion 52 is bounded on an upper end thereof by the upper edge 54 of the first door 32.

Similarly, the second door 34 includes a second tumblehome portion 56. The second tumblehome portion 56 is disposed along an upper portion of the first edge 48 of the second door 34. The second tumblehome portion 56 is the portion of the second door 34 that slopes inboard, i.e., inward, of the second rotation axis 44, i.e., the second tumblehome portion 56 slopes upward and inward toward the center of the vehicle 20 to an upper edge 58 of the second door 34, which is disposed inboard of the second rotation axis 44 a distance 61. The second tumblehome portion 56 is bounded on a lower end thereof by the spring line 108 of the opposing hinged doors 30. The second tumblehome portion 52 bends inward above the spring line 108. The second tumblehome portion 56 is bounded on an upper end thereof by the upper edge 58 of the second door 34. The second tumblehome portion 56 is disposed adjacent the first tumblehome portion 52 when the first door 32 and the second door 34 are disposed in their respective closed positions.

As shown in FIG. 2, the first tumblehome portion 52 and the second tumblehome portion 56 are spaced from each other to define a gap 60 between the first tumblehome portion 52 and the second tumblehome portion 56 when in their respective closed positions. The gap 60 allows simultaneous rotational movement of the first door 32 about the first rotation axis 36 and the second door 34 about the second rotation axis 44 without the first tumblehome portion 52 and the second tumblehome portion 56 interfering with each other. Because the first tumblehome portion 52 extends inboard away from the centerline of the first rotation axis 36, the second edge 42 of the first door 32 swings toward the second door 34, until passing the centerline of the first rotation axis 36, whereupon the second edge 42 of the first door 32 then starts to swing away from the second door 34. Similarly, because the second tumblehome portion 56 extends inboard away from the centerline of the second rotation axis 44, the first edge 48 of the second door 34 swings toward the first door 32, until passing the centerline of the second rotation axis 44, whereupon the first edge 48 of the second door 34 then starts to swing away from the first door 32. Accordingly, the gap 60 spaces the second edge 42 of the first door 32 from the first edge 48 of the second door 34 to allow the first door 32 and the second door 34 to simultaneously swing open and/or closed without contacting each other or otherwise interfering with each other.

Figure 4:
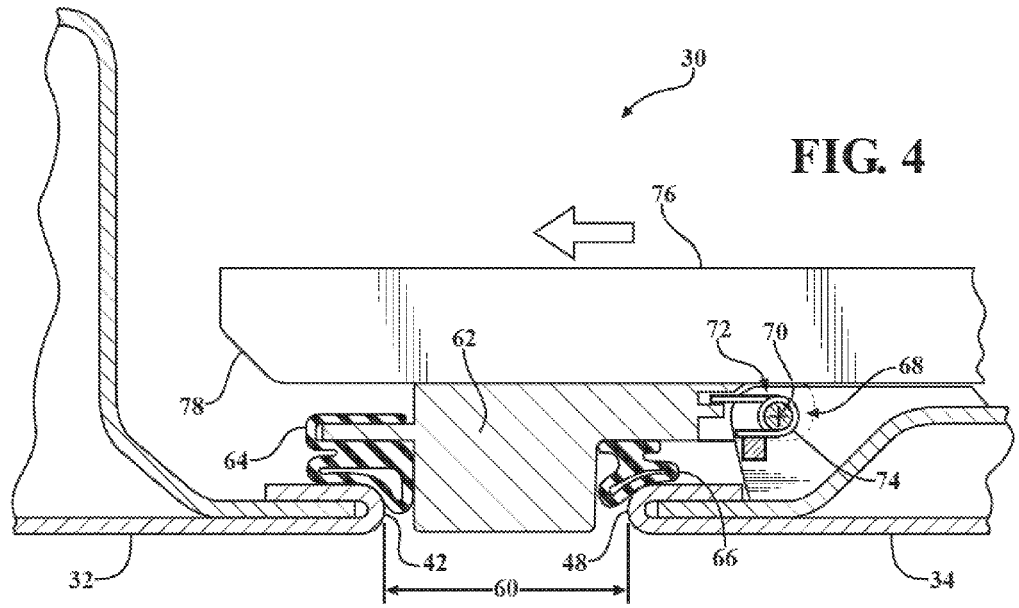
FIG. 4 is a schematic fragmentary cross sectional view taken a long cut line 4-4 shown in FIG. 2 of the pair of opposing-hinged doors showing an appliqué in a sealing position.
Figure 5:
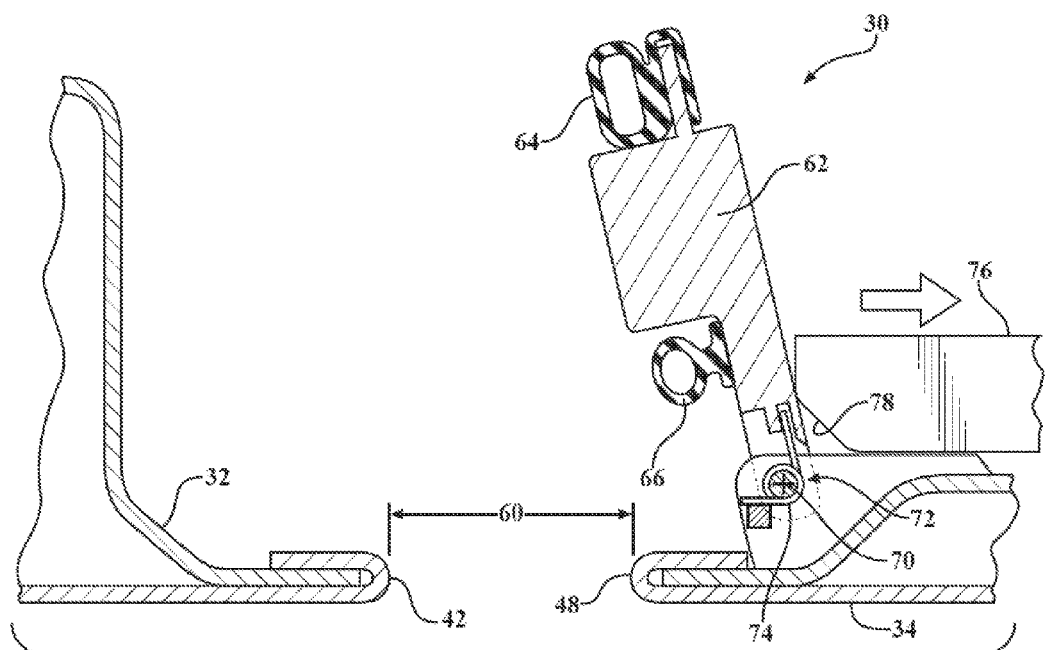
FIG. 5 is a schematic fragmentary cross sectional view of the pair of opposing-hinged doors showing the appliqué in a withdrawn position.

Referring to FIGS. 4 and 5, an appliqué 62 is moveably coupled to one of the first door 32 and the second door 34. As shown, the appliqué 62 is movably coupled to the second door 34. The appliqué 62 is coupled to the second door 34 adjacent the second tumblehome portion 56. The appliqué 62 is moveable between a sealing position shown in FIG. 4, and a withdrawn position shown in FIG. 5. The appliqué 62 extends across the gap 60 when in the sealing position to cover the gap 60 between the first tumblehome portion 52 and the second tumblehome portion 56, and to seal against both the first door 32 and the second door 34. The appliqué 62 is spaced from one of the first door 32 and the second door 34 when in the withdrawn position. The appliqué 62 is spaced from the other of the first door 32 and the second door 34 from which the appliqué 62 is attached. Accordingly, as the appliqué 62 is shown attached to the second door 34, the appliqué 62 is spaced from the first door 32 when in the withdrawn position. However, it should be appreciated that if the appliqué 62 is attached to the first door 32, then the appliqué 62 would be spaced from the second door 34 when in the withdrawn position. The appliqué 62 is spaced from one of the first door 32 and the second door 34 to allow for the simultaneous rotation of the first door 32 about the first rotation axis 36 in the first rotation direction 38, and the second door 34 about the second rotation axis 44 in the second rotation direction 46, without interference between the first tumblehome portion 52 and the second tumblehome portion 56 as described above.

The appliqué 62 may include a first seal 64 and a second seal 66. The first seal 64 is disposed in sealing engagement with the first door 32 when the appliqué 62 is disposed in the sealing position. The second seal 66 disposed in sealing engagement with the second door 34 when the appliqué 62 is disposed in the sealing position. Accordingly, it should be appreciated that movement of the appliqué 62 into the sealing position moves the first seal 64 and the second seal 66 into sealing engagement with the first door 32 and the second door 34 respectively.

As shown in FIGS. 4 and 5, the vehicle 20 includes a pivotable connection 68 interconnecting the appliqué 62 and the second door 34. However, it should be appreciated that the pivotable connection 68 may alternatively interconnect the appliqué 62 and the first door 32. The appliqué 62 is pivotable between the sealing position and the withdrawn position about a pivot axis 70 that is defined by the pivotable connection 68.

The vehicle 20 may include an actuator 72 that is coupled to the appliqué 62. The actuator 72 is configured for moving the appliqué 62 into at least one of the sealing position and the withdrawn position. As shown in FIGS. 4 and 5, the actuator 72 includes a spring 74 interconnecting the appliqué 62 and the second door 34. However, it should be appreciated that the spring 74 may alternatively interconnect the appliqué 62 and the first door 32 if the appliqué 62 is moveably coupled to the first door 32. The spring 74 is configured to pivot the appliqué 62 about the pivot axis 70 and into the withdrawn position.

The vehicle 20 may further include a bar 76. The bar 76 is slideably moveable relative to the appliqué 62, between an extended position shown in FIG. 4, and a retracted position shown in FIG. 5. When in the extended position, the bar 76 secures the appliqué 62 in the sealing position. When in the retracted position, the bar 76 allows for the pivotable movement of the appliqué 62 about the pivot axis 70 into the withdrawn position.

The bar 76 may include a cam surface 78 for engaging the appliqué 62 and guiding the appliqué 62 between the sealing position and the withdrawn position. The cam surface 78 may include an angled surface or a curved surface. As the bar 76 moves between the extended position and the retracted position, the cam surface 78 engages the appliqué 62, and guides and/or urges the appliqué 62 between the sealing position and the withdrawn position. Movement of the bar 76 from the retracted position into the extended position urges the appliqué 62 from the withdrawn position into the sealing position. Movement of the bar 76 from the extended position into the retracted position allows the actuator 72 to move the appliqué 62 into the withdrawn position, with the actuator 72 biasing the appliqué 62 against the cam surface 78 of the bar 76 such that the cam surface 78 guides the appliqué 62 into the withdrawn position.

The bar 76 may be automatically actuated by movement of a door handle (not shown). As such, as the door handle is moved to open the second door 34, the bar 76 is automatically signaled to move from the extended position into the retracted position, thereby allowing the appliqué 62 to move into the withdrawn position. The bar 76 remains in the retracted position and the appliqué 62 remains in the withdrawn position until the second door 34 is closed. While the operation of the bar 76 and the appliqué 62 has herein been described with reference to opening the second door 34, it should be appreciated that if the appliqué 62 is attached to the first door 32, then the bar 76 and the appliqué 62 would be actuated by movement of the first door 32.

Figure 6:
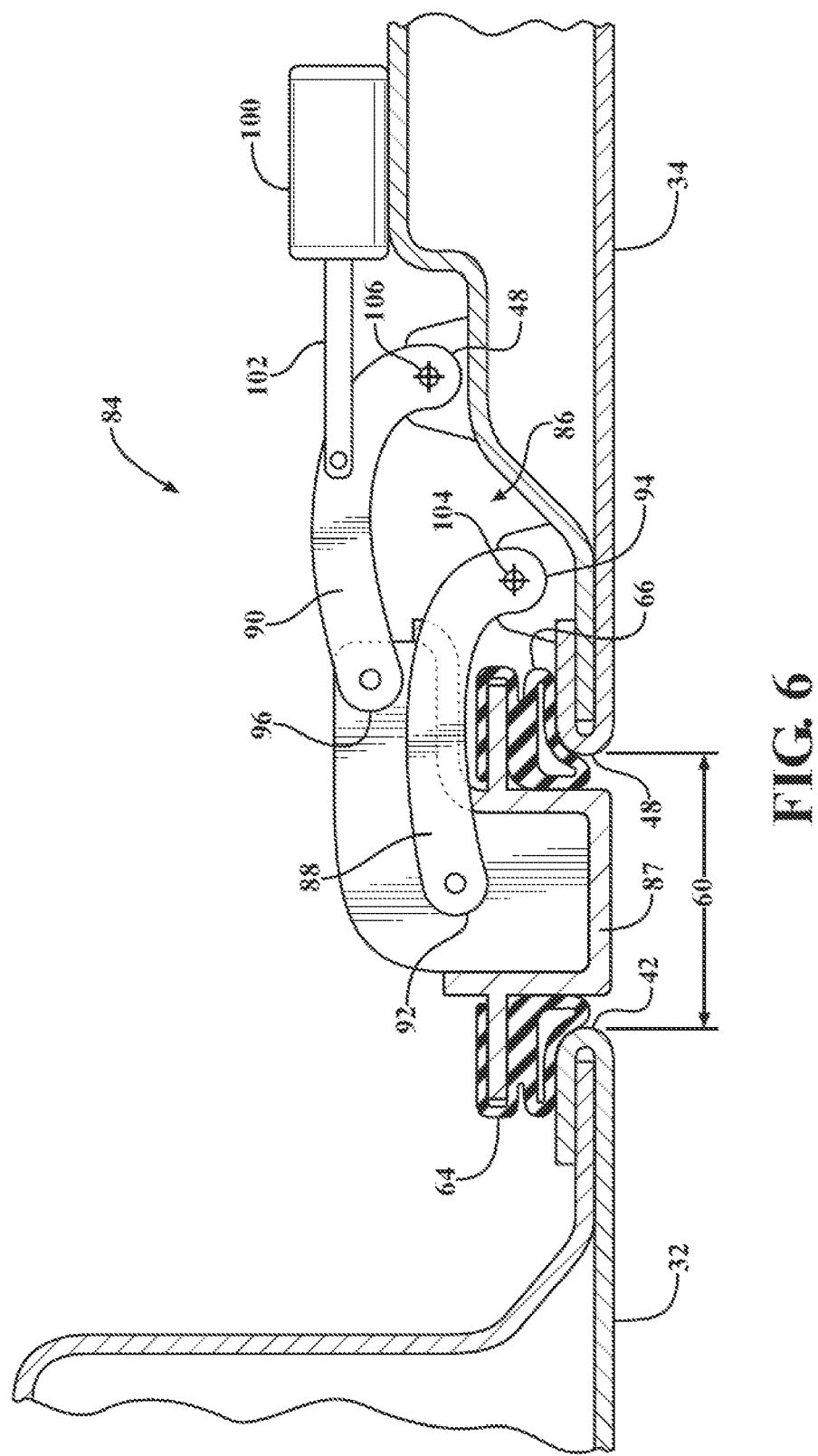
FIG. 6 is a schematic fragmentary cross sectional view of an alternative embodiment of the pair of opposing-hinged doors showing the appliqué in the sealing position.
Figure 7:
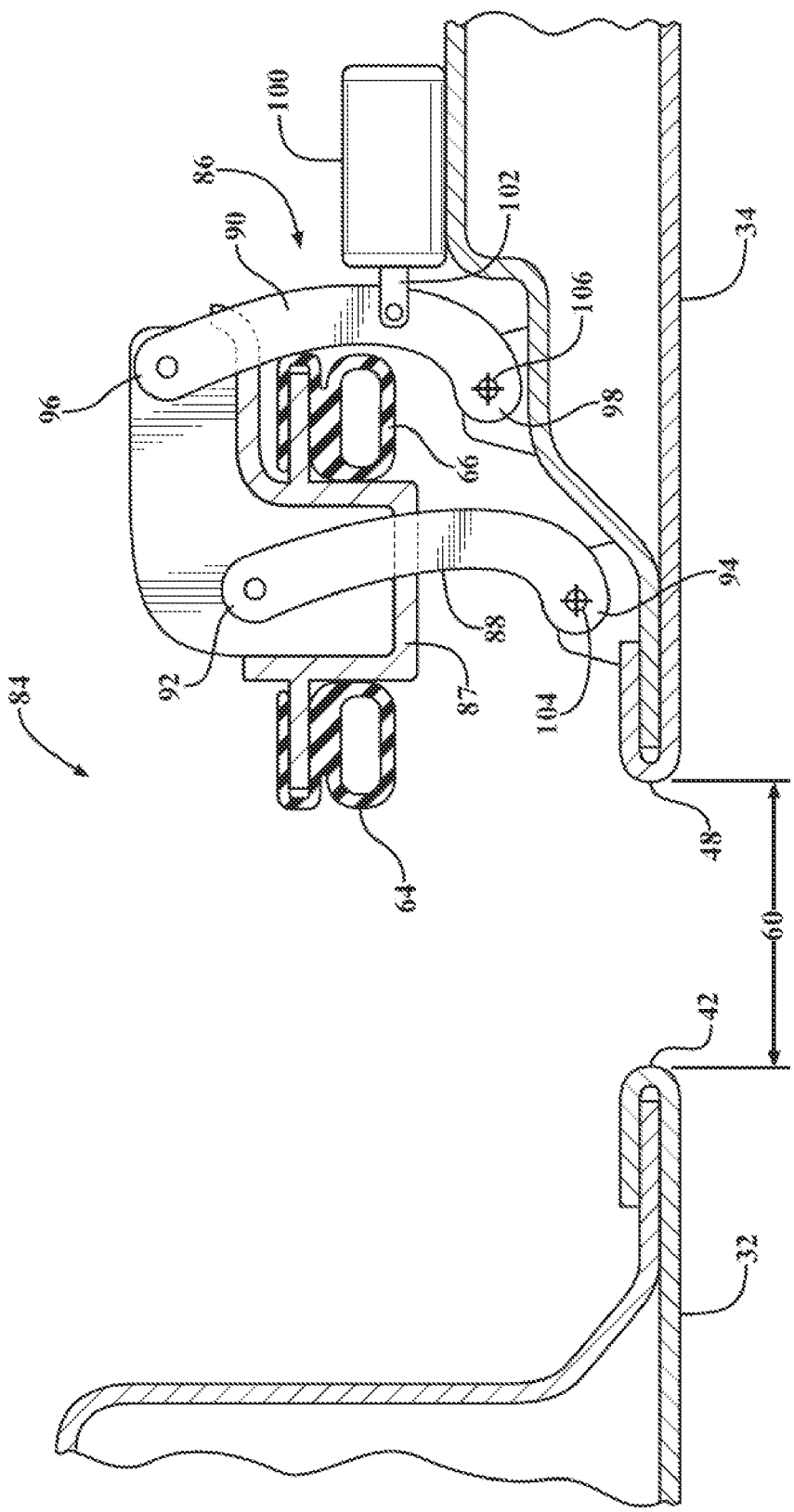
FIG. 7 is a schematic fragmentary cross sectional view of the alternative embodiment of the pair of opposing-hinged doors showing the appliqué in the withdrawn position.

Referring to FIGS. 6 and 7, an alternative embodiment of the opposing-hinged doors are generally shown at 84. The opposing-hinged doors 84 include the first door 32 and the second door 34 as described above. The opposing-hinged doors 84 shown in FIGS. 6 and 7 include a linkage system 86. The linkage system 86 interconnects an appliqué 87 and one of the first door 32 and the second door 34. As shown, the linkage system 86 interconnects the appliqué 87 and the second door 34.

The linkage system 86 may include a first swing arm 88 and a second swing arm 90. The first swing arm 88 includes a first end 92 and a second end 94. The first end 92 of the first swing arm 88 is rotatably coupled to the appliqué 87. The second end 94 of the first swing arm 88 is rotatably coupled to one of the first door 32 and the second door 34. As shown, the second end 94 of the first swing arm 88 is rotatably coupled to the second door 34. The second swing arm 90 includes a first end 96 and a second end 98. The first end 96 of the second swing arm 90 is rotatably coupled to the appliqué 87. The second end 98 of the second swing arm 90 is rotatably coupled to one of the first door 32 and the second door 34. As shown, the second end 98 of the second swing arm 90 is rotatably coupled to the second door 34. The second swing arm 90 is longitudinally spaced from the first swing arm 88 along the longitudinal axis 28. Because the first swing arm 88 and the second swing arm 90 are both coupled to the appliqué 87, both the first swing arm 88 and the second swing arm 90 pivot in unison to move the appliqué 87 between the sealing position shown in FIG. 6, and the withdrawn position shown in FIG. 7. Accordingly, the linkage system 86 swings the appliqué 87 away from or toward the first door 32 and the second door 34 as the appliqué 87 moves between the sealing position and the withdrawn position.

An actuator 100 is coupled to and configured for moving the linkage system 86. The actuator 100 moves the linkage system 86, which thereby moves the appliqué 87 between the sealing position and the withdrawn position. As shown, the actuator 100 is coupled to the second swing arm 90. However, it should be appreciated that the actuator 100 may be coupled to the linkage system 86 in some other manner not shown or described herein. The actuator 100 may include an electrically actuated device, such as an electric motor, that may linearly actuate a control member 102. Linear movement of the control member 102 moves the linkage system 86, causing the first swing arm 88 to pivot about a first pivot axis 104, and the second swing arm 90 to pivot about a second pivot axis 106. The pivotal movement of the first swing arm 88 and the second swing arm 90 moves the appliqué 87 between the sealing position and the withdrawn position.

While the best modes for carrying out the invention have been described in detail, those familiar with the art to which this invention relates will recognize various alternative designs and embodiments for practicing the invention within the scope of the appended claims.

The invention claimed is:

1. A vehicle comprising
a body;
a pair of opposing-hinged doors including a first door rotatably attached to the body for rotation in a first rotation direction, and a second door disposed adjacent the first door and rotatably attached to the body for rotation in a second rotation direction opposite the first direction;
wherein each of the first door and the second door define a tumblehome portion;
wherein the tumblehome portion of the first door and the tumblehome portion of the second door are spaced from each other to define a gap between the first door and the second door when the first door and the second door are in a closed position;
an appliqué coupled to at least one of the first door and the second door adjacent the tumblehome portions of the first door and the second door, and moveable between a sealing position and a withdrawn position, wherein the appliqué extends across the gap between the tumblehome portions when in the sealing position to cover the gap and seal against both the first door and the second door, and wherein the appliqué is spaced from at least one of the first door and the second door when in the withdrawn position to allow for the simultaneous rotation of the first door and the second door without interference between the tumblehome portions of the first door and the second door;
an actuator coupled to the appliqué and configured for moving the appliqué into at least one of the sealing position and the withdrawn position;
a pivotable connection interconnecting the appliqué and one of the first door and the second door, wherein the appliqué is pivotable between the sealing position and the withdrawn position about a pivot axis defined by the pivotable connection;
wherein the actuator includes a spring interconnecting the appliqué and one of the first door and the second door, wherein the spring is configured to pivot the appliqué about the pivot axis and into the withdrawn position; and
a bar slideably moveable relative to the appliqué between an extended position securing the appliqué in the sealing position, and a retracted position allowing the pivotable movement of the appliqué about the pivot axis into the withdrawn position.

2. A vehicle as set forth in claim 1 wherein the appliqué includes a first seal disposed in sealing engagement with the first door when the appliqué is disposed in the sealing position, and a second seal disposed in sealing engagement with the second door when the appliqué is disposed in the sealing position.

3. A vehicle as set forth in claim 1 wherein the bar includes a cam surface for engaging the appliqué and guiding the appliqué between the sealing position and the withdrawn position.

4. A vehicle comprising:
a body;
a pair of opposing-hinged doors including a first door rotatably attached to the body for rotation in a first rotation direction, and a second door disposed adjacent the first door and rotatably attached to the body for rotation in a second rotation direction opposite the first direction;
wherein each of the first door and the second door define a tumblehome portion;
wherein the tumblehome portion of the first door and the tumblehome portion of the second door are spaced from each other to define a gap between the first door and the second door when the first door and the second door are in a closed position;
an appliqué coupled to at least one of the first door and the second door adjacent the tumblehome portions of the first door and the second door, and moveable between a sealing position and a withdrawn position, wherein the appliqué extends across the gap between the tumblehome portions when in the sealing position to cover the gap and seal against both the first door and the second door, and wherein the appliqué is spaced from at least one of the first door and the second door when in the withdrawn position to allow for the simultaneous rotation of the first door and the second door without interference between the tumblehome portions of the first door and the second door;
an actuator coupled to the appliqué and configured for moving the appliqué into at least one of the sealing position and the withdrawn position; and
a linkage system interconnecting the appliqué and one of the first door and the second door;
wherein the actuator is coupled to and configured for moving the linkage system to move the appliqué between the sealing position and the withdrawn position; and
wherein the linkage system includes a first swing arm having a first end rotatably coupled to the appliqué and a second end rotatably coupled to one of the first door and the second door, and a second swing arm having a first end rotatably coupled to the appliqué and a second end rotatably coupled to the same one of the first door and the second door that the second end of the first swing arm is coupled to, wherein the second swing arm is spaced from the first swing arm, and both the first swing arm and the second swing arm pivot in unison to move the appliqué between the sealing position and the withdrawn position.

5. A vehicle as set forth in claim 4 wherein the actuator includes an electrically actuated device.

6. A vehicle as set forth in claim 4 wherein the first rotation direction is one of a clockwise direction and a counterclockwise direction, and the second rotation direction is the other of the clockwise direction and the counterclockwise direction.

7. A vehicle comprising a body;

a pair of opposing-hinged doors including a first door rotatably attached to the body for rotation between an open position and a closed position about a first rotation axis in a first rotation direction, and a second door disposed adjacent the first door and rotatably attached to the body for rotation between an open position and a closed position about a second rotation axis in a second rotation direction opposite the first rotation direction;

wherein the first door includes a first tumblehome portion extending inboard of the first rotation axis and a first lateral edge, and the second door includes a second tumblehome portion extending inboard of the second rotation axis and a second lateral edge, wherein the second lateral edge is disposed adjacent the first lateral edge when the first door and the second door are disposed in their respective closed positions;

wherein the first lateral edge and the second lateral edge are spaced from each other to define a gap between the first tumblehome portion and the second tumblehome portion when in their respective closed positions to allow simultaneous rotational movement of the first door about the first rotation axis and the second door about the second rotation axis without the first tumblehome portion and the second tumblehome portion interfering with each other;

an appliqué moveably coupled to the second door adjacent the second tumblehome portion and moveable between a sealing position and a withdrawn position, wherein the appliqué extends across the gap when in the sealing position to cover the gap between the first tumblehome portion and the second tumblehome portion and seal against both the first door and the second door, and wherein the appliqué is spaced from the first door when in the withdrawn position to allow for the simultaneous rotation of the first door about the first rotation axis in the first rotation direction and the second door about the second rotation axis in the second rotation direction;

wherein the appliqué includes a first seal disposed in sealing engagement with the first door when the appliqué is disposed in the sealing position, and a second seal disposed in sealing engagement with the second door when the appliqué is disposed in the sealing position;

an actuator coupled to the appliqué and configured for moving the appliqué into at least one of the sealing position and the withdrawn position;

wherein the actuator includes a spring interconnecting the appliqué and the second door, wherein the spring is configured to pivot the appliqué about the pivot axis and into the withdrawn position; and a bar slideably moveable relative to the appliqué between an extended position securing the appliqué in the sealing position, and a retracted position allowing the pivotable movement of the appliqué about the pivot axis into the withdrawn position.

8. A vehicle as set forth in claim 7 further comprising a linkage system interconnecting the appliqué and the second door, wherein the linkage system includes a first swing arm having a first end rotatably coupled to the appliqué and a second end rotatably coupled to the second door, and a second swing arm having a first end rotatably coupled to the appliqué and a second end rotatably coupled to the second door, wherein the second swing arm is spaced from the first swing arm, and both the first swing arm and the second swing arm pivot in unison to move the appliqué between the sealing position and the withdrawn position.

9. A vehicle as set forth in claim 7 wherein the first rotation direction is one of a clockwise direction and a counterclockwise direction, and the second rotation direction is the other of the clockwise direction and the counterclockwise direction.

* * * * *